May 21, 1968  D. M. KLANG  3,384,210
CLUTCH DRIVE CIRCUIT
Filed March 4, 1966
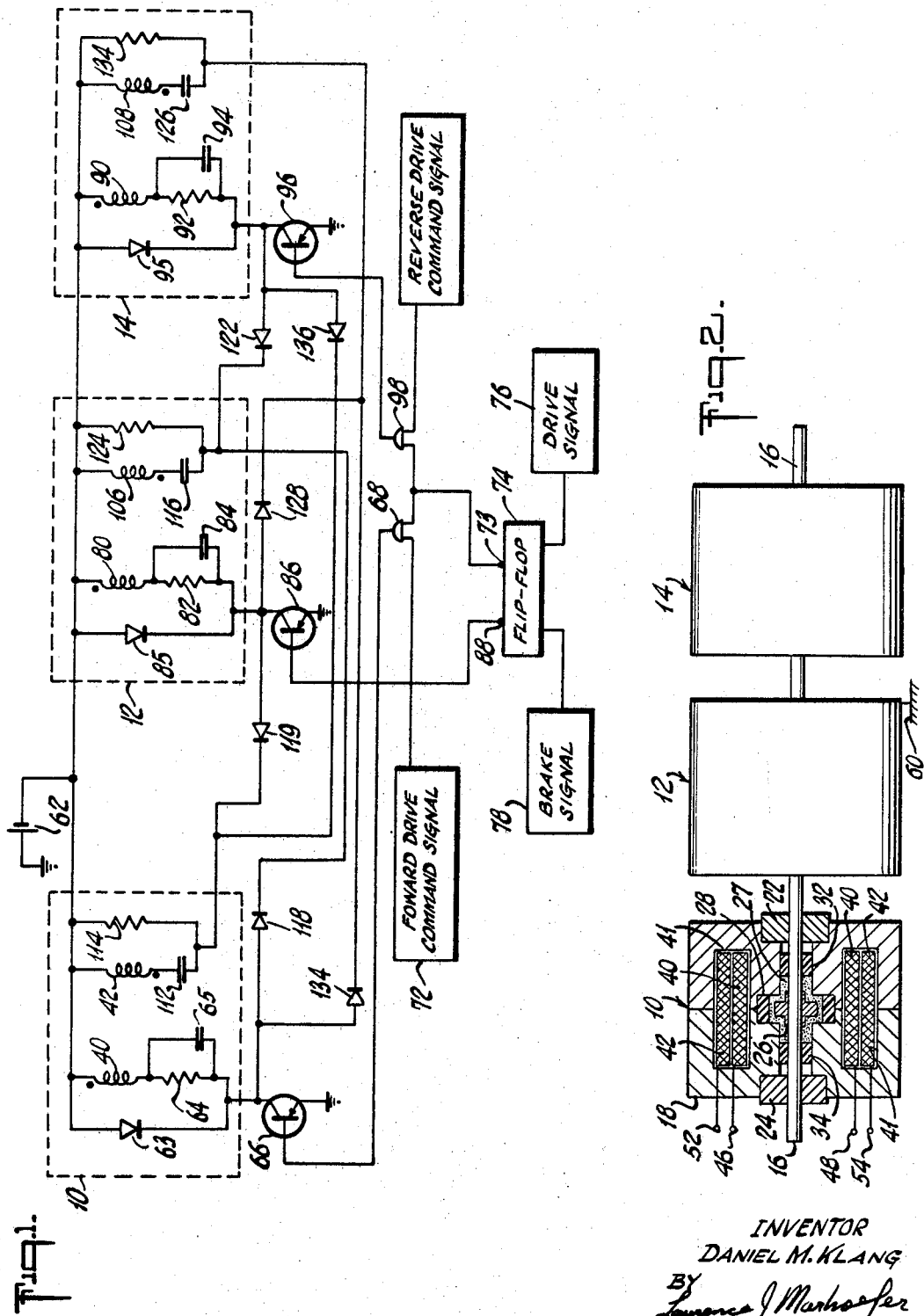
INVENTOR
DANIEL M. KLANG
BY
Lawrence J. Marhoefer
ATTORNEY

United States Patent Office 3,384,210
Patented May 21, 1968

3,384,210
CLUTCH DRIVE CIRCUIT
Daniel M. Klang, Huntington Station, N.Y., assignor to Potter Instrument Company, Inc., Plainview, N.Y., a corporation of New York
Filed Mar. 4, 1966, Ser. No. 531,844
4 Claims. (Cl. 192—12)

This invention relates to a circuit for energizing and de-energizing an electromagnetic clutch and brake which are used in combination to rapidly accelerate and stop a rotatable shaft and, more particularly, to a simple circuit for operating, in unison, a magnetic particle brake and reversible clutch of the type which employ auxiliary windings for decreasing the time required to establish or collapse the particle magnetizing field.

Certain information tape transports known in the prior art, such as incremental transports in which information is recorded on and read from the tape, a single bit at a time, employ a magnetic particle clutch and brake in combination to drive a capstan. The clutch is engaged, coupling the capstan to a continuously rotating motor, and the brake is simultaneously disengaged to drive the capstan, and, conversely, the brake is engaged and the clutch simultaneously disengaged to stop the capstan.

A magnetic particle clutch (or brake) has a drive coil which is energized to engage the clutch. The drive coil, when energized, produces a magnetic field which links together small magnetic particles disposed between the driving and driven members of the clutch. The time required to establish this magnetic field and the time required to collapse it are factors which limit the operating speed of a magnetic particle clutch or brake.

The use of an auxiliary winding has been proposed in the prior art to decrease the time required to build-up or collapse the magnetizing field. However, the circuit, known in the prior art for actuating a magnetic particle clutch and brake which employ auxiliary windings are complex and costly.

One object of this invention is the provision of an improved circuit for operating in unison a magnetic particle clutch and brake which employ auxiliary windings.

Another object of this invention is the provision of an improved circuit for operating a magnetic particle clutch and brake in which the auxiliary winding is energized to aid in both establishing and collapsing the magnetic field.

Briefly, this invention contemplates the provision of a circuit for operating in unison a magnetic particle clutch and brake in which a transistor switch is coupled in series with each drive coil. The brake auxiliary winding is coupled through a capacitor to the transistor switch in series with the clutch drive coil. Similarly, the clutch auxiliary winding is coupled through a capacitor to the transistor switch in series with the brake drive coil.

The brake switch and clutch switch are driven from opposite sides of flip-flop and thereby operate in a complementary manner. When the brake switch is closed, the clutch switch is therefore simultaneously opened, and current flows through the brake coil and, initially, through the clutch auxiliary coil, charging the capacitor in series with it. The field produced by the current flow in the clutch auxiliary winding aids in collapsing the clutch field. Additionally, the capacitor in series with the brake auxiliary winding discharges, producing a field which aids in establishing the brake magnetizing field.

Similarly, when the clutch switch is closed, the brake switch is simultaneously opened, and current flows through the clutch drive coil, and through the brake auxiliary winding, producing a field which aids in collapsing the brake magnetizing field. The capacitor in series with the clutch auxiliary winding discharges, and this discharge current flows in the clutch auxiliary winding, aiding in establishing the clutch magnetizing field.

The above objects as well as other objects of the present invention will become apparent from the following description taken in conjunction with the drawings, in which like reference numerals denote like parts, and in which:

FIG. 1 is a schematic view of a reversible magnetic particle clutch and brake showing one embodiment of a circuit in accordance with the teachings of this invention for operating the brake and clutch in unison; and FIG. 2 is a side view of the reversible clutch and brake shown schematically in FIG. 1, with the forward drive clutch shown in cross section.

More particularly, referring now to FIG. 2 of the drawings, a forward drive magnetic particle clutch 10, a magnetic particle brake 12, and a reverse drive magnetic particle clutch 14 are disposed on a rotatably mounted shaft 16. The clutches 10 and 14 and the brake 12 are substantially identical in construction. In the clutch 10, for example, a pair of bearings 22 and 24 rotatably mount a rotor 18 on the shaft 16. For ease of manufacture, the rotor 18 is made in two halves which are joined together in a suitable manner known in the art.

A centrally disposed disc 26 is fixedly secured to the shaft 16, and is surrounded by fine particles 27 of iron or other suitable magnetizable material. Annular rings 28, 32 and 34 of a suitable non-magnetic material, such as Teflon, maintain the particles 26 in place.

A driver coil 40, disposed in an annular cavity 41 in the rotor 18, surrounds the disc 24 and particles 26. An auxiliary coil 42, which has the same number of turns as driver coil 40 but is of opposite polarity, is also disposed in the cavity 41. A pair of leads 46 and 48 couple coil 40 to a pair of slip rings (not shown), by means of which the coil is energized. A pair of leads 52 and 54 couple the auxiliary coil 42 to another pair of slip rings (not shown), by means of which the auxiliary coil is energized.

The clutch 10 is typical of those known in the prior art. In operation, when coil 40 is energized, the particles 26 link together and couple the rotor 18, which is driven by a motor (not shown), to the disc 26 which is fixed to the shaft 16.

The essential difference between the clutch 10 and brake 12 is that a suitable structure, indicated schematically at 60, mechanically holds the rotor of brake 12 and prevents its rotation. Additionally, it will be understood that the rotor of clutch 14 is driven in the direction opposite to that in which the rotor of clutch 10 is driven.

Referring now to FIG. 1, one terminal of the forward clutch drive coil 40 is coupled to the negative terminal of a direct current power supply 62, the positive terminal of which is grounded. The other terminal of coil 40 is coupled through a small resistor 64, shunted by a speed-up capacitor 65, to the collector of a PNP transistor switch 66, the emitter of which is coupled to ground. A negative signal on the base of transistor 66 drives this transistor into saturation, and current flows from ground, through coil 40, to the negative terminal of battery 62. The magnetic field produced by this current engages the clutch 10. A clamping diode 63 shunts the coil 40 and resistor 64, providing path through which the coil 40 can discharge when the transistor 66 is cut off.

Similarly, the brake 12 has a drive coil 80, one terminal of which is coupled to the negative terminal of D-C supply 62. The other terminal of drive coil at 80 is coupled through a small resistor 82, which is shunted by a speed-up capacitor 84, to the collector of a PNP transistor switch 86 the emitter of which is coupled to ground. A negative signal on the base of transistor 86 drives this transistor into saturation, and current flows from ground through coil 80, to the negative terminal of source 62. The field produced by this current engages the brake. A clamping diode 85 shunts the coil 80 and resistor 82, providing a path through which coil 80 can discharge when transistor 86 is cutoff.

The reverse clutch 14 has a drive coil 90 similar to the forward clutch coil 40 and the brake coil 80. One terminal of coil 90 is coupled to the negative terminal of D-C supply 62, and its other terminal is coupled through a small resistor 92, shunted by a speed-up capacitor 94, to the collector of a PNP transistor switch 96 the emitter of which is coupled to ground. A negative signal on the base of transistor 96 drives this transistor into saturation, and current flows from ground, through coil 90, to the negative terminal of source 62. This current engages clutch 14. A clamping diode 95 shunts the coil 90 and resistor 92, and provides a path for the discharge of coil 90 when transistor 96 is cutoff.

The bases of clutch transistor switches 66 and 96 are coupled via AND gates 68 and 98, respectively, to an output terminal 73 of a flip-flop 74. A signal from a forward drive command source 72 enables gate 68 when it is desired to drive shaft 16 in a forward direction, and a signal from a reverse drive source 102 enables gate 98 when it is desired to drive shaft 16 in a reverse direction. The base of brake transistor switch 86 is coupled to the other output terminal of flip-flop 74.

To drive shaft 16, a signal from a drive signal source 76, coupled to the input of flip-flop 74, switches the flip-flop to a first stable state in which the potential of terminal 73 is negative and terminal 88 rests at ground or at some positive potential. In this state, transistor 66 or 96 is driven to saturation, depending on whether gate 68 or 98 is enabled, and transistor 86 is cutoff.

To brake shaft 16, a signal from brake signal source 72 switches flip-flop 74 to its second stable state in which terminal 88 is positive and terminal 73 rests at ground. In this state, transistor 86 saturates, and transistors 66 and 96 are cutoff.

The forward clutch 10, reverse clutch 14 and brake 12 are equipped with auxiliary coils 42, 108 and 106, respectively, for the purpose of decreasing the time required to build up and collapse the respective particle magnetizing fields. The clutch auxiliary coils 42 and 108 are coupled to the collector of the brake transistor switch 86 by means of capacitors 112 and 126, respectively, and steering diodes 119 and 128, respectively. The other terminal of the brake auxiliary coil 106 is coupled by a capacitor 116 to collectors of clutch switch transistors 66 and 96 via steering diodes 118 and 122, respectively.

A resistor 114 shunts clutch auxiliary coil 42 and capacitor 112 and provides a discharge path for capacitor 112 which includes coil 42. Similarly, resistors 124 and 134 shunt respective auxiliary coils 106 and 108 and the capacitors 116 and 126 connected in series with them, providing a discharge path for these capacitors. Resistors 114, 124 and 134 have a low value of resistance so that the time constant for the discharge of capacitors 112, 116 and 126 is low.

In operation, assume flip-flop 74 is in its second stable state with terminal 88 at a negative potential and terminal 73 at ground potential. Transistor switch 86 is on and transistor switches 66 and 96 are off. The brake is thus energized and prevents rotation of shaft 16.

Capacitors 112 and 126, which are in series with auxiliary coils 42 and 108, respectively, are charged to the potential of source 62 by current flow through diodes 119 and 128, respectively. There is no charge on the capacitor 116 in series with the brake auxiliary winding 106.

To drive the shaft 16 in a forward direction, gate 68 is enabled by source 72 and a pulse from source 76 switches flip-flop 74 to its first stable state at which terminal 73 is at a negative potential and terminal 88 rests at ground. Transistor switch 86 is turned off and, simultaneously, switch 66 is turned on.

Current starts flowing from ground through resistor 64 and coil 40 to the negative terminal of source 62. The magnetizing field of coil 40 begins to build. Simultaneously, since transistor 86 is cut off, capacitor 112 starts discharging through the low impedance of resistor 114 and the auxiliary coil 42. The flow of current in auxiliary coil 42 is in a direction opposite to direction of current flow in coil 40. Since the polarity of coil 40 is opposite to the polarity of coil 42, the fields produced by currents flowing in coils 40 and 42 are additive, decreasing the time required to engage the clutch. It should be noted that capacitor 112 discharges rapidly and that coil 42 therefore produces no magnetizing field when the clutch is fully engaged.

In the brake 12, when transistor switch 86 cuts off, the field of brake drive coil 80 starts to collapse and current flows through clamping diode 85 and resistor 82. Simultaneously, current coupled from transistor 66 via diode 118 and capacitor 116 initially flows in auxiliary winding 106. The current flow in brake coil 80, resulting from the collapsing field, is in the same direction as the current flow in auxiliary winding 106. The field of coil 106, therefore, opposes that of coil 80, reducing the net magnetic flux of the magnetic circuit comprising coil 80 and coil 106, and thus decreasing the time required for the field to collapse. Capacitor 116 rapidly charges to the potential of source 62, and current flow in auxiliary coil 106 falls to zero.

Additionally, when transistor 86 cuts off, capacitor 126 discharges through resistor 134 and reverse clutch auxiliary winding 108. However, the field produced by this current flow is not sufficient to engage the clutch 14, and its effect is negligible.

A brake command signal from source 78 switches flip-flop 74 to its second stable state, switching transistor 86 on and transistors 66 and 96 off. Clutch drive coil 40 discharges through clamping diode 63 and resistor 64 and capacitor 112 couples a short current pulse through the clutch auxiliary winding 42. The field produced by this current pulse in coil 42 opposes collapsing field coil 40, decreasing the time required to disengage clutch 10.

Current flows through transistor 86 and coil 80 building up the particle magnetizing field. Capacitor 116 discharges through resistor 124 and coil 106, producing a field which adds to the field produced by the current flowing in drive coil 80 and decreases the time required to engage the brake.

In the clutch 14, diode 128 and capacitor 126 couple current pulse from the collector of transistor 86 through the reverse clutch auxiliary winding 108. The field produced by coil 108 tends to engage the clutch 14 and augment the braking of shaft 16.

The operation of the reverse clutch 14 is identical to that of clutch 10, an additional explanation of its operation is therefore deemed unnecessary.

In certain applications, it is desirable to alternately engage the forward clutch 10 and reverse clutch 14 without engaging the brake 12 as an intermediate step. To aid in establishing and collapsing the particle magnetizing fields when operating in this mode, a diode 134 is provided to couple the collector of forward clutch switch 66 to the reverse clutch auxiliary coil 108 and a diode 136 is provided to couple the collector of the reverse clutch switch 96 to the forward clutch auxiliary coil 42. It will be appreciated that the operation of the auxiliary windings in aiding and collapsing the particle magnetizing fields in this operating mode is the same as that previously described for the clutch and brake in unison.

This invention may be variously modified and embodied within the scope of the subjoined claims.

What is claimed is:

1. A circuit for operating in unison an electromagnetic clutch and brake of the type in which the clutch and brake each have an operating coil and an auxiliary coil, comprising in combination;

first means for energizing the clutch operating coil,
second means for energizing the brake operating coil,
means for coupling the clutch auxiliary coil to said second means including a capacitor coupled in series with said clutch auxiliary coil, and
means for coupling said brake auxiliary coil to said first means including a capacitor coupled in series with said brake auxiliary coil.

2. A circuit as in claim 1 further including a resistor shunting said clutch auxiliary coil and said capacitor coupled in series therewith, and a resistor shunting said brake auxiliary coil and said capacitor coupled in series therewith.

3. A circuit as in claim 2 wherein said first means includes a transistor switch, and said second means includes a transistor switch.

4. A circuit as in claim 3 further including a flip-flop circuit, one output of which is coupled to said first transistor and the other output of which is coupled to said second transistor.

References Cited

UNITED STATES PATENTS

| 2,946,418 | 7/1960 | Leeson | 192—12.2 |
| 2,979,175 | 4/1961 | Schalk | 192—12.2 |
| 3,158,791 | 11/1964 | Deneen et al. | 317—148.5 |
| 3,208,567 | 9/1965 | Metzger | 192—12.2 |
| 3,223,212 | 12/1965 | Shepard | 192—18.2 |

FRED C. MATTERN, Jr., *Primary Examiner.*

ARTHUR T. McKEON, *Examiner.*